United States Patent [19]

Campagnolo

[11] 4,324,323
[45] Apr. 13, 1982

[54] FREEWHEEL DEVICE FOR BICYCLES

[76] Inventor: Tullio Campagnolo, Corso Padova 168, 36100 Vicenza, Italy

[21] Appl. No.: 50,778

[22] Filed: Jun. 21, 1979

[30] Foreign Application Priority Data

Jun. 23, 1978 [IT] Italy .............................. 22169 B/78

[51] Int. Cl.³ .......................................... F16D 41/24
[52] U.S. Cl. ...................................... 192/64; 474/160
[58] Field of Search ............ 192/64; 74/217 B, 750 B, 74/243 R; 29/159.2; 474/160, 903; 301/105 B; 308/192

[56] References Cited

U.S. PATENT DOCUMENTS

| 1,316,270 | 9/1919 | Calkins | 29/159.2 X |
| 2,179,967 | 11/1939 | Thompson | 74/243 R |
| 3,286,329 | 11/1966 | Naruse et al. | 29/159.2 |
| 3,398,444 | 8/1968 | Nemy | 29/159.2 |
| 3,900,088 | 8/1975 | Ozaki | 192/64 |
| 4,121,474 | 10/1978 | Suinaga | 74/243 R X |

FOREIGN PATENT DOCUMENTS

| 2440908 | 3/1975 | Fed. Rep. of Germany | 29/159.2 |
| 348777 | 4/1905 | France | 308/192 |
| 539558 | 6/1922 | France | 192/64 |
| 39685 | 2/1932 | France | 192/64 |
| 1224650 | 6/1960 | France | 192/64 |
| 1334006 | 6/1963 | France | 192/64 |
| 420012 | 4/1947 | Italy | 474/160 |
| 226376 | 12/1924 | United Kingdom | 192/64 |
| 232107 | 4/1925 | United Kingdom | 192/64 |
| 437057 | 10/1935 | United Kingdom | 474/160 |
| 1384356 | 2/1975 | United Kingdom | 192/64 |

Primary Examiner—Rodney H. Bonck
Attorney, Agent, or Firm—Young & Thompson

[57] ABSTRACT

Freewheel device being formed by elements made of superlight material treated with a hard chromium plating, in which: the smallest sprocket wheel of the freewheel has a diameter almost equal to that of the inner body of the device onto the end of which it is fitted, and said end comprises two or more notches to be engaged by a control spanner, said notches extending axially in a very pronounced manner—the adjustment is carried out by means of a single spacer—the spring controlling the pawl of the freewheel consists of a steel wire engaging said pawl in the manner of a leaf spring.

1 Claim, 3 Drawing Figures

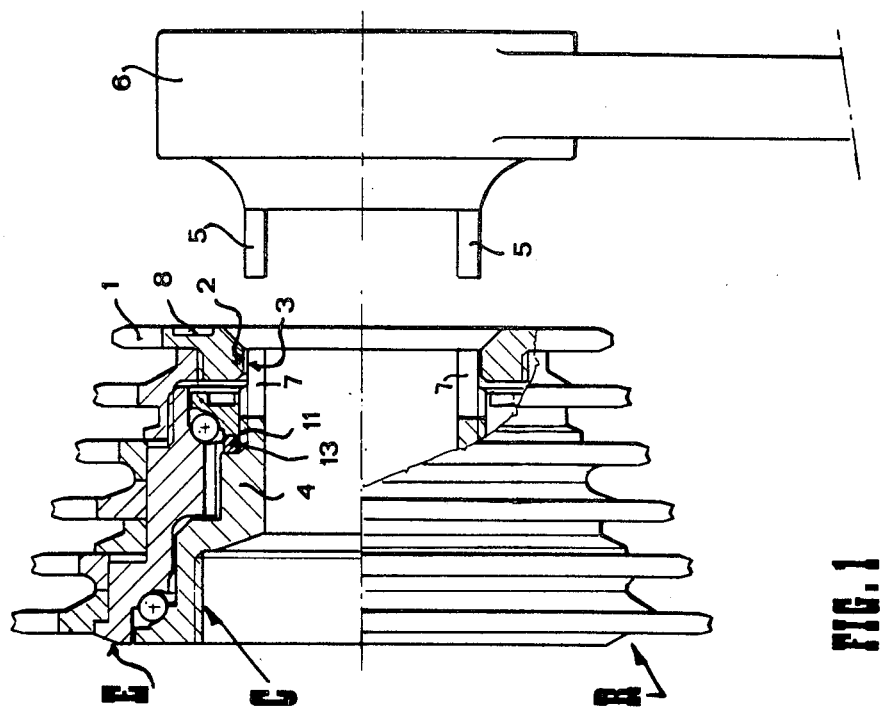
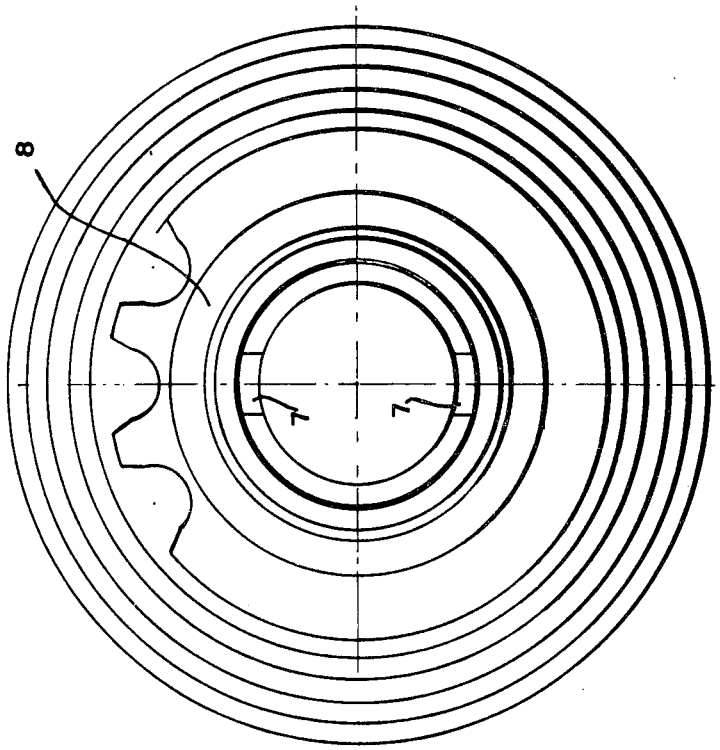

FREEWHEEL DEVICE FOR BICYCLES

BACKGROUND OF THE INVENTION

The present invention relates to important improvements in freewheel devices and, particularly, in freewheel devices used in the transmissions of bicycles, especially sports and competition bicycles in which the freewheel is combined with the set of sprocket wheels of different diameter and number of sprockets, being mounted on the rear wheel axis and being designed to mesh with the transmission chain for driving the wheel.

The freewheel devices used at present on bicycles have various drawbacks, which are particularly felt when using the bicycle in competition, and the object of the present invention is to eliminate or reduce such drawbacks, thus rendering a great service to sportsmen in general and to cyclist racers and their mechanics in particular.

SUMMARY OF THE INVENTION

For the aforespecified purpose the present invention relates to a freewheel device comprising, either independently or in combination, the following characteristics:

the inside diameter of the smallest sprocket wheel of the freewheel is almost equal to the diameter of the inner body of the device onto the end of which it fits, and said end comprises two or more notches to be engaged by a control spanner, said notches extending axially in a very pronounced manner;

the elements of the freewheel, and particularly the sprocket wheels, are made of extremely light material, treated with a hard chromium plating;

the freewheel adjustment is carried out by means of a single spacer of appropriate thickness, instead of the various smaller spacers normally used;

the spring controlling the pawl of the freewheel consists of a steel wire, an end of which engages said pawl in the manner of a leaf spring, and the other end of which is bent into an eyelet, to be applied onto a support pin and oppose the body of the freewheel itself.

BRIEF DESCRIPTION OF THE DRAWINGS

The invention is illustrated in the accompanying drawings, which show a freewheel device comprising all the characteristics as heretofore described. It is to be understood, however, that freewheel devices comprising only part, or even only one of these characteristics, are equally included within the protection scope of the invention itself.

In the accompanying drawings:

FIG. 1 is a cross section view of the freewheel device according to the invention and of a control spanner for the assembly and disassembly thereof;

FIG. 2 is a front view of the device of FIG. 1; and

DESCRIPTION OF THE PREFERRED EMBODIMENT

Figure 3:
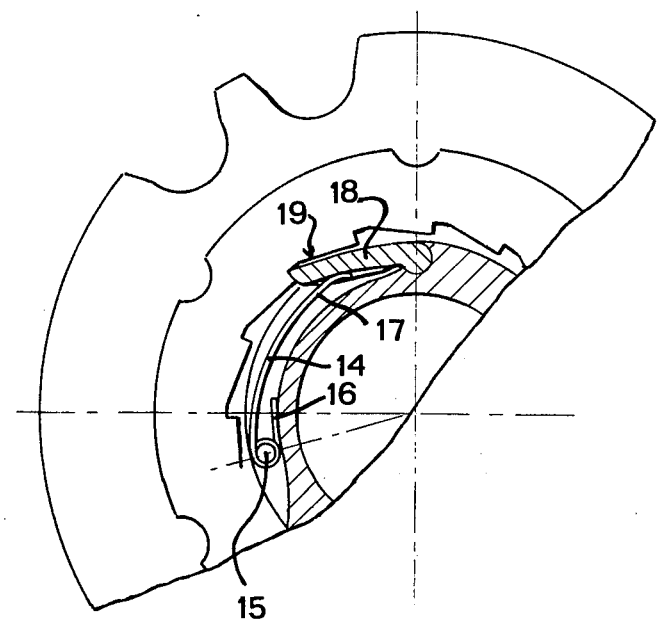
FIG. 3 shows an inner detail of the same device.

The freewheel device for bicycles shown in the drawings comprises, in a known way, an inner body C, an outer body E, and a set of six sprocket wheels R having different diameters and numbers of sprockets.

According to a first characteristic of the invention, the smallest sprocket wheel 1 of the sprocket wheels R is made with its inside diameter 2 much smaller than is found at present in devices of this type, and namely, almost equal to the diameter 3 of the end 4 of the inner body C of the freewheel. In this way, the pins 5 of the spanner 6 (shown, in FIG. 1, in an operating position) are easily and efficiently guided for insertion into the correspondingly shaped notches 7 of the end 4 of the body C, when using the spanner 6 for the assembly or disassembly of the device. The described arrangement, in addition to facilitating the introduction of the spanner 6, considerably improves its performance, in that it precludes any possible oscillation thereof during operation and it preserves in good condition both the device and the spanner, thanks to the fact that their correct engagement prevents the notches and pins from being mutually damaged. To improve even further the said engagement, the present invention also provides for the notches 7 to have a very pronounced axial extent—far more pronounced than that at present in use and in fact greater than the axial extent of the smallest sprocket wheel 1, as can be seen in FIG. 1—and for the pins 5 to be consequently long. As a result, the freewheel assembly or disassembly operation is thereby facilitated and it allows the parts engaged in the operation to be preserved better and last longer.

FIG. 2 shows the first sprocket wheel 1, of the set of sprocket wheels R, carrying on its front surface, visible from the outside, an annular depressed area 8 onto which may be applied an inscription or a trade mark or the like, which—being located on a surface which is recessed in respect of the front surface—will not be easily damaged during use of the bicycle, as would happen if it were simply applied to the said front surface.

According to a further characteristic of the invention, all the parts of the freewheel, and particularly the inner and outer bodies and the sprocket wheels, are made from specially treated materials. It is well known that the conventional freewheels are now-a-days produced from superlight materials, having the considerable drawback of presenting a very low superficial hardness and being hence very easily subjected to rapid wear. To eliminate this drawback—without giving up the fundamental characteristic of the lightness—invention proposes, on the freewheel parts of superlight material, a hard chromium plating treatment. This treatment is carried out, in particular, on the inner body C, on the outer body E and on the sprocket wheels R of the freewheel.

A third characteristic of the freewheel device according to the invention concerns the adjustment of the device itself. It is known that, at present, said adjustment is carried out by means of a certain number of very thin washers (approx. 0.1 to 0.3 mm.). Such washers are apt to break rather easily just because of their small thickness and they are likely to wedge, at least partly, into the adjustment threading 11, causing evident damage and trouble. To avoid this drawback, the present invention adopts—in substitution for the various washers of small thickness—a single spacer 13 of appropriate thickness. Since such thickness is never less than 1 mm., the efficiency of this arrangement is evident.

A further characteristic of the device according to the invention relates to the spring controlling the pawl of the freewheel, shown in the detail of FIG. 3. It consists of a steel wire 14 engaging—in the manner of a leaf spring—with one of its ends 17 the pawl 18, while its other end is bent into an eyelet, to be applied onto the support pin 15 and engage the freewheel body at 16. This arrangement enables the pawl 18 to be driven very smoothly and evenly into engagement with the teeth 19 of the corresponding rack of the freewheel.

I claim:

1. A freewheel device for bicycles, comprising an inner body, an outer body mounted for rotation on the inner body, a plurality of sprocket wheels of different size mounted on the outer body, a smallest sprocket wheel on the outer end of the inner body, the outer end of the inner body being hollow and cylindrical, the inner diameter of the smallest sprocket wheel being almost equal to the outer diameter of said end of said inner body, and a plurality of axially extending notches in said outer end of said inner body for the reception of a spanner, said notches having an axial extent greater than the axial extent of said smallest sprocket wheel, said notches extending radially entirely through said hollow cylindrical outer end of the inner body, said smallest sprocket wheel radially outwardly closing the radially outer sides of said notches at the outer ends of said inner body, the outer side of said smallest sprocket wheel having a bevel that terminates at the inside diameter of said smallest sprocket wheel at about the outer end of said inner body.

* * * * *